United States Patent
Lin et al.

(10) Patent No.: US 11,353,735 B2
(45) Date of Patent: Jun. 7, 2022

(54) ELECTRONIC DEVICE

(71) Applicant: Innolux Corporation, Miao-Li County (TW)

(72) Inventors: Yi Hung Lin, Miao-Li County (TW); I-Yin Li, Miao-Li County (TW); Chia-Chi Ho, Miao-Li County (TW); Hsiuyi Tsai, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 16/939,064

(22) Filed: Jul. 27, 2020

(65) Prior Publication Data
US 2021/0048705 A1 Feb. 18, 2021

Related U.S. Application Data

(60) Provisional application No. 62/898,627, filed on Sep. 11, 2019, provisional application No. 62/885,362, filed on Aug. 12, 2019.

(30) Foreign Application Priority Data

May 19, 2020 (CN) .......................... 202010423100.0

(51) Int. Cl.
*G02F 1/1333* (2006.01)
*G02F 1/1339* (2006.01)

(52) U.S. Cl.
CPC ...... *G02F 1/133382* (2013.01); *G02F 1/1339* (2013.01)

(58) Field of Classification Search
CPC .......................... G02F 1/133382; G02F 1/1339
USPC ......................................................... 349/161
See application file for complete search history.

(56) References Cited

U.S. PATENT DOCUMENTS

2020/0073168 A1* 3/2020 Zhao ................. G02F 1/136286

FOREIGN PATENT DOCUMENTS

CN 109643841 4/2019

* cited by examiner

*Primary Examiner* — Nathanael R Briggs
*Assistant Examiner* — William D Peterson
(74) *Attorney, Agent, or Firm* — JCIPRNET (57) ABSTRACT

An electronic device including a pair of substrates, a sealant, and a heating unit is provided. Each of the pair of substrates includes a peripheral area and an active area, and each of the peripheral areas are adjacent to an edge of a corresponding one of the pair of substrates. The sealant is disposed between the pair of substrates. The heating unit is disposed on one of the pair of substrates and comprising a first portion disposed in the peripheral area of the one of the pair of substrates and adjacent to an edge of the one of the pair of substrates, a third portion disposed in the active area, and a second portion connecting the first portion and the third portion. The resistance of the first portion is less than a resistance of the third portion. Therefore, the electronic device may have improved heating efficiency.

18 Claims, 6 Drawing Sheets

ELECTRONIC DEVICE

CROSS-REFERENCE TO RELATED APPLICATION

This application claims the priority benefits of U.S. provisional application Ser. No. 62/885,362, filed on Aug. 12, 2019, U.S. provisional application Ser. No. 62/898,627, filed on Sep. 11, 2019, and China application serial no. 202010423100.0, filed on May 19, 2020. The entirety of each of the above-mentioned patent applications is hereby incorporated by reference herein and made a part of this specification.

BACKGROUND

Technical Field

The disclosure relates to an electronic device, in particular to a liquid crystal device.

Description of Related Art

When a normal electronic device is being operated in a low temperature environment, due to certain characteristics of materials of the electronic device, the electronic device may not function normally. For instance, when a liquid crystal display device or a liquid crystal antenna device is in a low temperature environment, subject to the characteristics of the liquid crystal material, the liquid crystal display device or the liquid crystal antenna device may not be able to perform display or communication functions in a normal manner, which requires further improvement.

SUMMARY

The disclosure provides an electronic device with a heating function.

According to an embodiment of the disclosure, an electronic device including a pair of substrates, a sealant, and a heating unit is provided. Each of the pair of substrates includes a peripheral area and an active area. Each of the peripheral areas are adjacent to an edge of a corresponding one of the pair of substrates. The sealant is disposed between the pair of substrates. The heating unit is disposed on one of the pair of substrates and includes a first portion disposed in the peripheral area and adjacent to an edge of the substrate, a third portion disposed in to the active area, and a second portion connecting the first portion and the third portion. A resistance of the first portion is less than a resistance of the third portion.

According to an embodiment of the disclosure, an electronic device including a pair of substrates, a sealant, and a heating unit is provided. The sealant is disposed on one of the pair of substrates. The heating unit is disposed on one of the pair of substrates. The heating unit includes a first portion and a second portion. The second portion is disposed within a range surrounded by the sealant, and the first portion is a portion of the heating unit other than the second portion of the heating unit. A resistance of the first portion is less than a resistance of the second portion.

In view of the above, the electronic device provided in one or more embodiments of the disclosure may provide different resistances respectively corresponding to heating units in different regions of the substrates to improve the heating efficiency of the heating units for the electronic device.

The disclosure may be understood by referring to the following detailed descriptions with reference to the accompanying drawings. In order to make it easy to comprehend and for the simplicity of the drawings, the drawings in the disclosure depict a part of the electronic device, and specific components in the drawings are not drawn to scale. In addition, the number and the size of each component in the drawings are merely exemplary and are not intended to limit the scope of the disclosure.

DESCRIPTION OF THE EMBODIMENTS

Some words are used to refer to specific components in the whole specification and the appended claims in the disclosure. A person skilled in the art should understand that an electronic device manufacturer may use different names to refer to the same components. This specification is not intended to distinguish components that have the same functions but different names. In this specification and the claims, words such as "include", "comprise", and "have" are open-ended words, and should be interpreted as "including, but not limited to".

The directional terms mentioned herein, like "above", "below", "front", "back", "left", and "right", refer to the directions in the accompanying drawings. Therefore, the directional terms are used for illustration instead of limiting the disclosure. In the accompanying drawings, common features of a method, a structure and/or a material used in a specific embodiment are shown in the drawings. However, these drawings should not be construed as defining or limiting the scope or nature of these embodiments. For instance, the relative sizes, thicknesses and positions of films, regions and/or structures may be reduced or enlarged for clarity.

A structure (or layer, component, substrate) described in the disclosure located on/above another structure (or layer, component, substrate) may refer to the two structures being adjacent and directly connected, or may refer to the two structures being adjacent but indirectly connected. Indirect connection means that there is at least one intermediary structure (or intermediary layer, intermediary component, intermediary substrate, intermediary interval) between the two structures, the lower surface of one structure is adjacent to or directly connected to the upper surface of the intermediary structure, and the upper surface of the other structure is adjacent to or directly connected to the lower surface of the intermediary structure. The intermediary structure may be a single-layer or multi-layer physical structure or a non-physical structure, which should not be construed as a limitation in the disclosure. In the disclosure, when a structure is disposed "on" another structure, the structure may be "directly" on the other structure, or the structure may be "indirectly" on the other structure, i.e., at least one structure is sandwiched by the two structures.

The term "coupled to (or connected)" used in the entire specification of the disclosure (including the claims) may refer to any direct or indirect means of connection. For instance, if a first device is described as being coupled to (or connected to) a second device, it should be interpreted as that the first device can be directly connected to the second device, or the first device can be indirectly through other devices or some connection means to the second device. In addition, the term "joining and connecting" may include a case where both structures are movable or both structures are fixed. In addition, the term "coupled to" includes any direct and indirect electrical connection means.

"About," "approximately," or "substantially" used in the specification includes a stated value and an average value within an acceptable deviation range of ±10%, ±5%, ±3%, ±2%, ±1%, or ±0.5%. The quantity given here is an approximate quantity, and the meaning of "about," "approximately," or "substantially" may be implied without specifying "about," "approximately," or "substantially". In addition, the term "within a range between a first value and a second value" means that the range includes the first value, the second value, and other values therebetween.

The ordinal numbers used in the specification and claims, such as "first", "second", etc., are used to modify the components, and are not intended to imply and represent this, or these, a component has any previous ordinal number, and does not represent the order of a component and another component, or the order of manufacturing methods. The ordinal numbers serve to enable a component with a certain name to have the same name as another. Components can make a clear distinction. The same words may not be used in the claims and the description, and accordingly, the first component in the description may be the second component in the claims. It should be noted that the following embodiments can replace, recombine, and mix technical features in several different embodiments to complete other embodiments without departing from the spirit of the disclosure.

In an embodiment of the disclosure, an electronic device includes but is not limited to a display device, an antenna device, a sensing device, or a splicing device. The electronic device may be a bendable or flexible electronic device. The display device may include, for instance, liquid crystal, light emitting diode (LED), quantum dot (QD), fluorescence, phosphor, other suitable materials, or a combination of the above materials, which should however not be construed as a limitation in the disclosure. The LED may include, for instance, an organic light emitting diode (OLED), a mini light emitting diode (mini LED), a micro light emitting diode (micro LED), a quantum dot light emitting diode (QLED or QDLED), fluorescence, phosphor, or other suitable materials, and the material may be arbitrarily arranged and combined, which should however not be construed as limitations in the disclosure. The antenna device may be, for instance, a liquid crystal antenna device, which should however not be construed as a limitation in the disclosure. The splicing device may be, for instance, a display splicing device or an antenna splicing device, which should however not be construed as a limitation in the disclosure. It should be noted that the electronic device may be any arrangement and combination described above, which should however not be construed as a limitation in the disclosure.

Figure 1A:
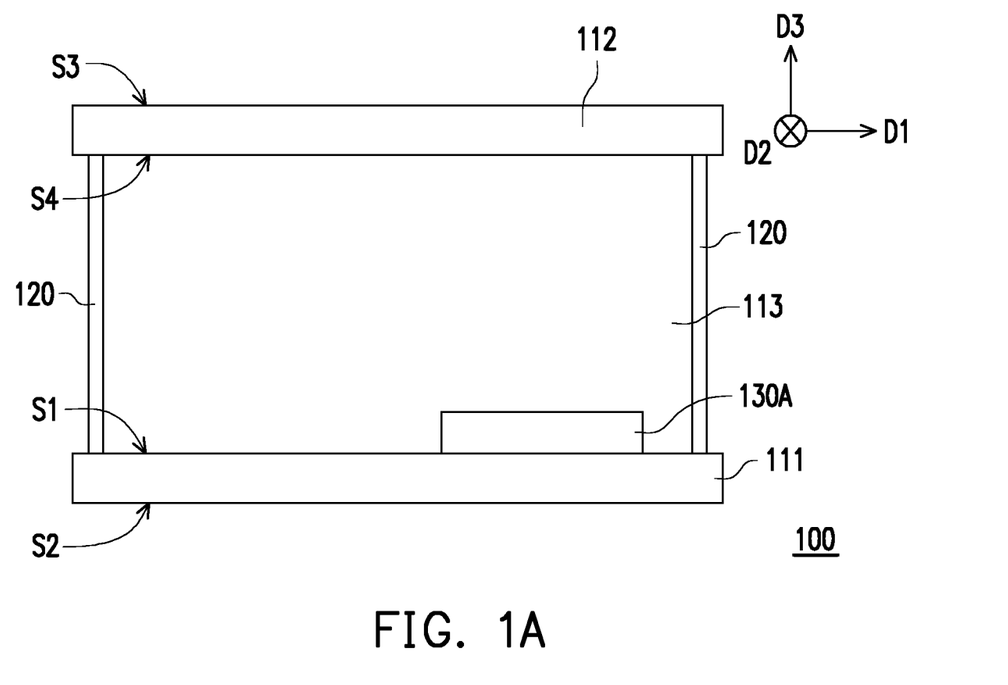
FIG. 1A is a schematic cross-sectional view of an electronic device 100 according to an embodiment of the disclosure.

FIG. 1A is a schematic cross-sectional view of an electronic device 100 according to an embodiment of the disclosure. In the embodiment, the electronic device 100 includes a first substrate 111, a second substrate 112, a liquid crystal layer 113, a sealant 120, and a heating unit 130A. The first substrate 111 and the second substrate 112 extend along a plane defined by a direction D1 and a direction D2, respectively. The direction D1, the direction D2, and a direction D3 are different. For instance, the directions D1, D2, and D3 are perpendicular to each other. The direction D3 is the normal direction of the first substrate 111. The liquid crystal layer 113 may be disposed between the first substrate 111 and the second substrate 112, and liquid crystal molecules may be included in the liquid crystal layer 113. The sealant 120 is disposed between the first substrate 111 and the second substrate 112 and surrounds the liquid crystal layer 113. The first substrate 111 includes a first surface S1 and a second surface S2, and the first surface S1 and the second surface S2 are disposed corresponding to each other. The second substrate 112 includes a third surface S3 and a fourth surface S4, and the third surface S3 and the fourth surface S4 are disposed corresponding to each other. In the embodiment, the heating unit 130A may be disposed between the first substrate 111 and the second substrate 112 and disposed on the first surface S1 of the first substrate 111. Switch components (not shown) or other circuits may be further disposed on the first surface S1 of the first substrate 111 or the fourth surface S4 of the second substrate 112, which should not be construed as a limitation in the disclosure. The heating unit 130A provided in the embodiment may provide a heat source to the electronic device 100 to adjust an operating temperature of the liquid crystal layer 113 in the electronic device 100.

Figure 1B:
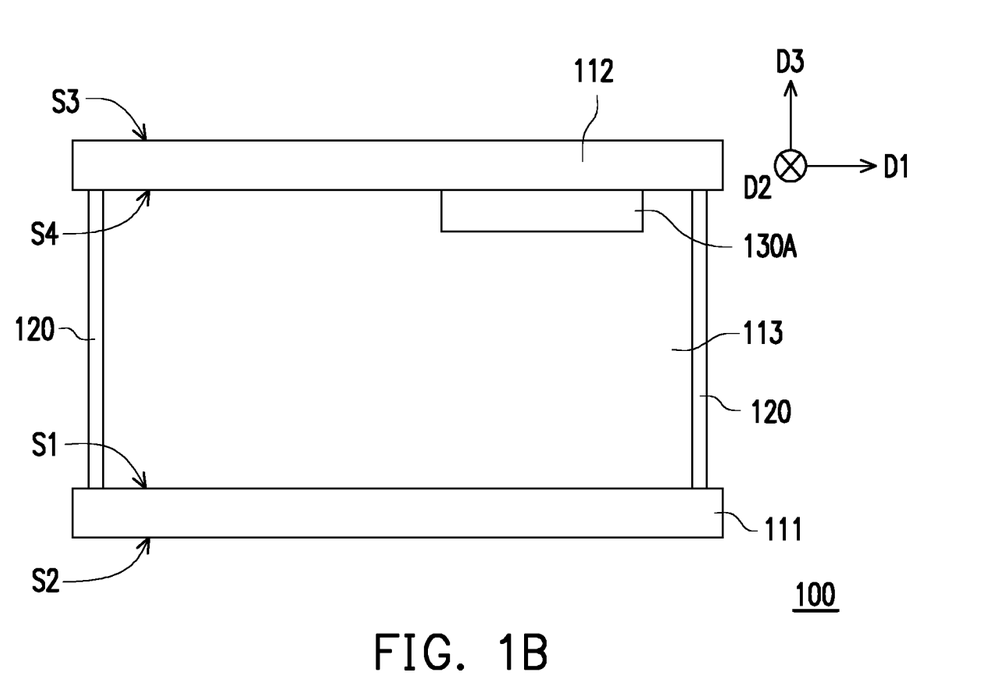
FIG. 1B is a schematic view of a second position where a heating unit is disposed according to an embodiment of the disclosure.

FIG. 1B is a schematic view of a second position where a heating unit is disposed according to an embodiment of the disclosure. The structure depicted in FIG. 1B is similar to the structure depicted in FIG. 1A, and therefore the same components share the same reference numbers and will not be further described hereinafter. The main difference between the two figures is the position of the heating unit 130A. With reference to FIG. 1B, in the electronic device 100, the heating unit 130A may be disposed between the first substrate 111 and the second substrate 112 and disposed on the fourth surface S4 of the second substrate 112.

Figure 1C:
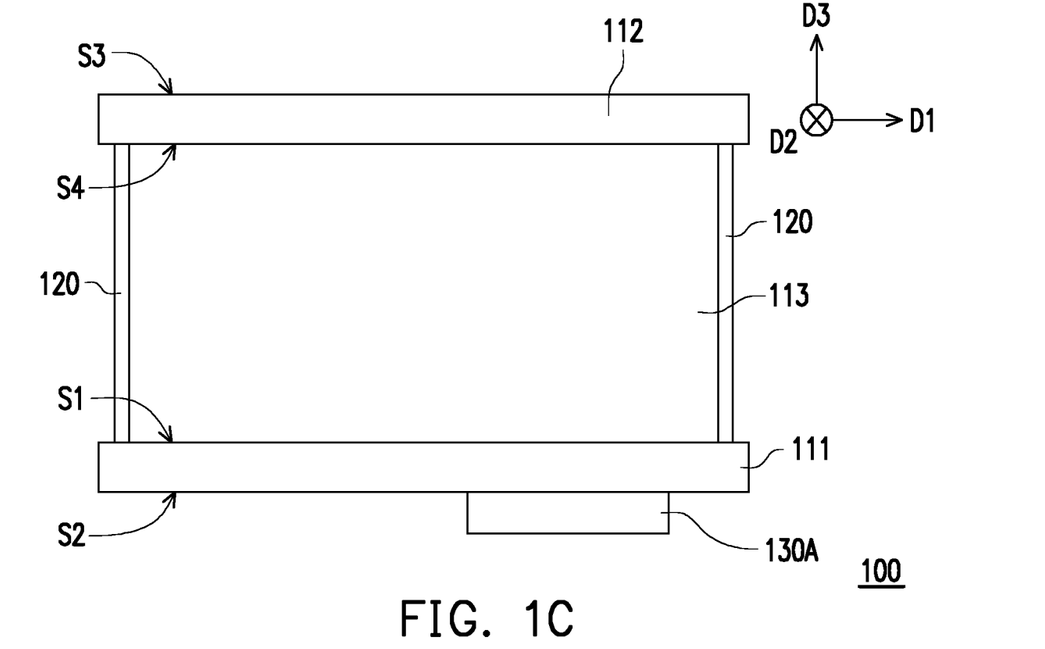
FIG. 1C is a schematic view of a third position where the heating unit is disposed according to an embodiment of the disclosure.

FIG. 1C is a schematic view of a third position where the heating unit is disposed according to an embodiment of the disclosure. The structure depicted in FIG. 1C is similar to the structure depicted in FIG. 1A, and therefore the same components share the same reference numbers and will not be further described hereinafter. The main difference between the two figures is the position of the heating unit 130A. With reference to FIG. 1C, in the electronic device 100, the heating unit 130A may be disposed on the first substrate 111, for instance, on the second surface S2 of the first substrate 111.

Figure 1D:
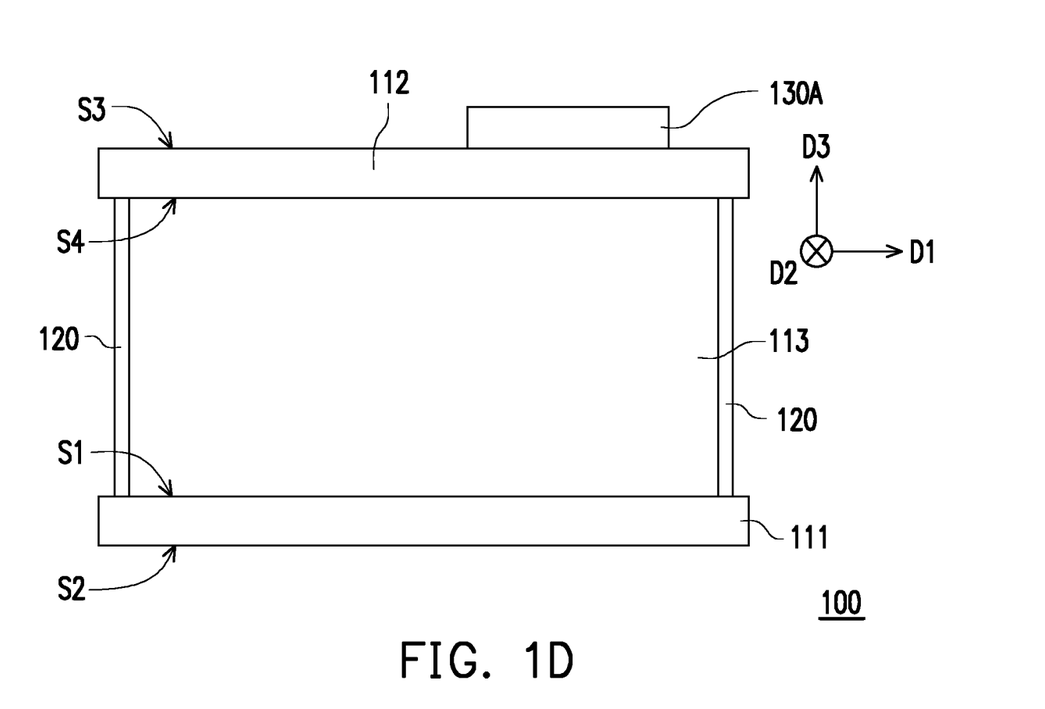
FIG. 1D is a schematic view of a fourth position where the heating unit is disposed according to an embodiment of the disclosure.

FIG. 1D is a schematic view of a fourth position where the heating unit is disposed according to an embodiment of the disclosure. The structure depicted in FIG. 1D is similar to the structure depicted in FIG. 1A, and therefore the same components share the same reference numbers and will not be further described hereinafter. The main difference between the two figures is the position of the heating unit 130A. With reference to FIG. 1D, in the electronic device 100, the heating unit 130A may be disposed on the second substrate 112, for instance, on the third surface S3 of the second substrate 112.

In the disclosure, the number and the locations of the heating units 130A are not limited. For instance, the heating units 130A may be disposed on both the first substrate 111 and the second substrate 112, which should however not be construed as a limitation in the disclosure.

Figure 2:
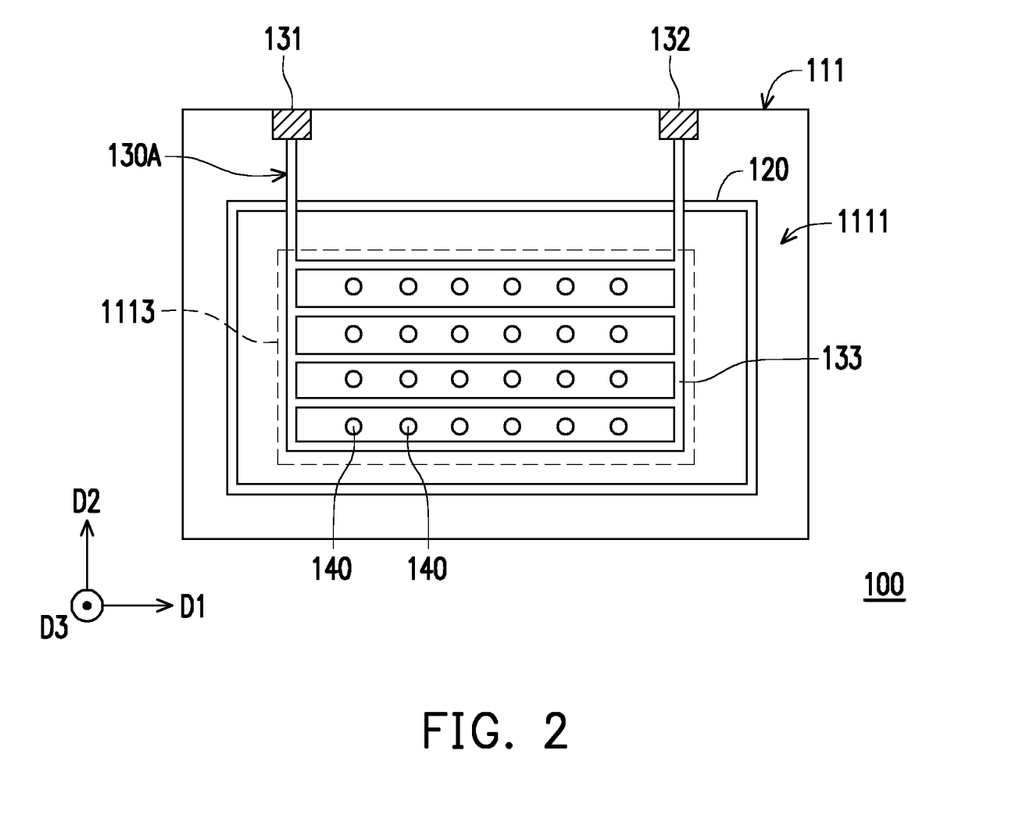
FIG. 2 is a top view of a substrate having a heating unit in an electronic device according to an embodiment of the disclosure.

FIG. 2 is a top view of a substrate having a heating unit in an electronic device according to an embodiment of the disclosure. Please refer to FIG. 1A and FIG. 2. For instance, the heating unit 130A may be disposed on the first substrate 111, which should however not be construed as a limitation in the disclosure. In other embodiments of the disclosure, the heating unit 130A may also be disposed on one of the first substrate 111 and the second substrate 112 as shown in FIG. 1B, FIG. 1C, or FIG. 1D. In the embodiment, please refer to FIG. 2, from the top view direction of the first substrate 111 (also referred to as the normal direction or the direction D3 of the first substrate 111), the sealant 120, the heating unit 130A, and operating units 140 may be disposed on the first substrate 111, which should however not be construed as a limitation in the disclosure. The sealant 120 may be disposed between the first substrate 111 and the second substrate 112. The first substrate 111 may include a peripheral area 1111 and an active area 1113. The peripheral area 1111 and the active area 1113 may be distinguished by the sealant 120. For instance, the active area 1113 of the first substrate 111 is within a range surrounded by the sealant 120, and the peripheral area 1111 is outside the range surrounded by the sealant 120. The operation units 140 may be located within the range of the active area 1113. The heating unit 130A may include a first pad 131, a second pad 132, and a plurality of heating wires 133 coupled between the first pad 131 and the second pad 132. The first pad 131 and the second pad 132 may be disposed in the peripheral area 1111 of the first substrate 111 and adjacent to an edge of the first substrate 111. Some of the heating wires 133 may be located in the active area 1113, and the other heating wires 133 may be located between the active area 1113 and the peripheral area 1111. To be more precisely, the other heating wires 133 may be partially overlapped with the active area 1113 and the peripheral area 1111 in the top view direction. The electronic device 100 may apply an appropriate voltage to the first pad 131 and the second pad 132 according to the use requirements or changes to the ambient temperature, and the first pad 131 and the second pad 132 serve as voltage input pads. The voltage applied to the first pad 131 and the voltage applied to the second pad 132 may be designed to be different, and the voltage difference allows the heating wires 133 to consume power or generate heat, so as to heat the electronic device 100.

In the embodiment, the electronic device 100 is, for instance, an antenna device, such as a liquid crystal antenna device. Therefore, the operation units 140 in the active area 1113 may be microwave devices, which should however not be construed as a limitation in the disclosure. In another embodiment, the electronic device 100 may also be a liquid crystal panel, so the operation units 140 in the active area 1113 may be pixel units, which should however not be construed as a limitation in the disclosure. In the embodiment, the first pad 131, the second pad 132, and the heating wires 133 of the heating unit 130A may be made of a single-layer conductive material or a multi-layer conductive material, respectively; in other embodiments, some of the heating wire 133 may be made of a single-layer conductive material or a multi-layer conductive material. The conductive material includes, for instance, copper (Cu), aluminum (Al), molybdenum (Mo), titanium (Ti), indium tin oxide (ITO), other suitable materials, or combinations of the above-mentioned materials, which should however not be construed as a limitation in the disclosure. As such, the liquid crystal molecules corresponding to the operation units 140 in the active area 1113 may be heated.

In the embodiment, the operation units 140 may be located within the active area 1113. The active area 1113 may be defined by an outer edge of a column of operation units 140 closest to the edge of the first substrate 111, an outer edge of a row of operation units 140 closest to the edge of the first substrate 111, and a length toward the edge of the first substrate 111. For instance, the outer edge of a column of operation units 140 closest to the edge of the first substrate 111, the outer edge of a row of operation units 140 closest to the edge of the first substrate 111, and a length of 500 μm toward the edge of the first substrate 111 may together define the active area 1113, which should however not be construed as a limitation in the disclosure.

Figure 3:
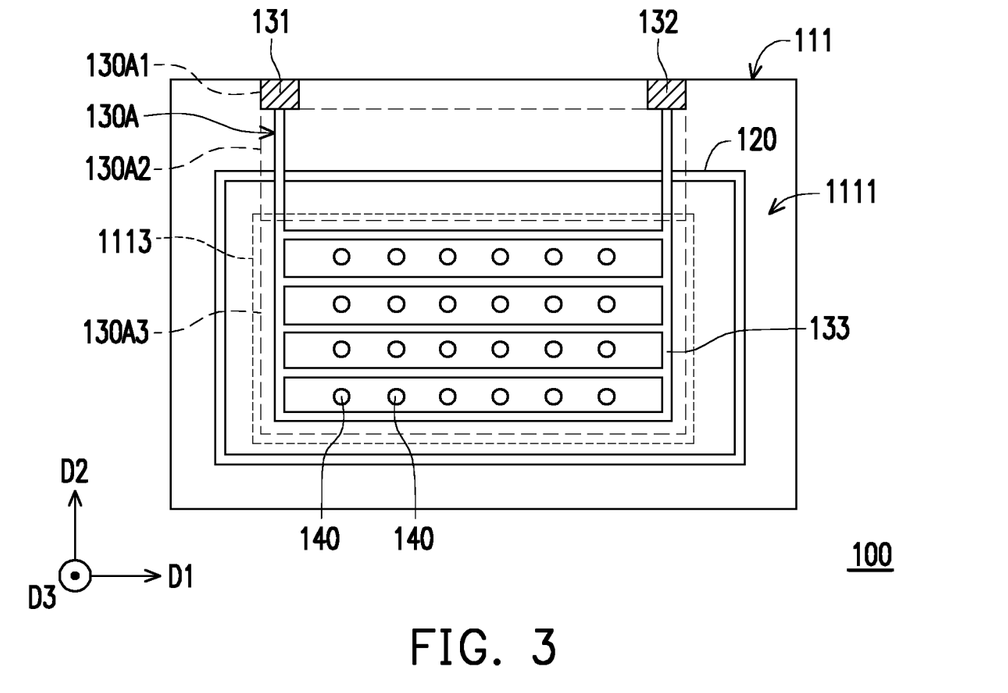
FIG. 3 schematically illustrates a configuration of a first resistance of a heating unit according to an embodiment of the disclosure.

FIG. 3 schematically illustrates a configuration of a first resistance of a heating unit according to an embodiment of the disclosure. With reference to FIG. 1A and FIG. 3, for instance, the heating unit 130A is disposed on the first substrate 111, which should however not be construed as a limitation in the disclosure. In other embodiments of the disclosure, the heating unit 130A may also be disposed at the location shown in FIG. 1B, FIG. 1C, or FIG. 1D. In addition, since the configuration in FIG. 3 and the configuration in FIG. 2 are the same, the same components share the same reference numbers and will not be further described hereinafter. In the embodiment, the heating unit 130A may include a first portion 130A1 disposed in the peripheral area 1111 and adjacent to the edge of the first substrate 111, a third portion 130A3 disposed corresponding to the active area 1113, and a second portion 130A2 connecting the first portion 130A1 and the third portion 130A3. The active area 1113 may be defined by the outer edge of a column of operation units 140 closest to the edge of the first substrate 111, the outer edge of a row of operation units 140 closest to the edge of the first substrate 111, and a length toward the edge of the first substrate 111, and the length is, for instance, 500 μm. The first portion 130A1 of the heating unit 130A may be a voltage input pad and includes a first pad 131 and a second pad 132. The first portion 130A1 of the heating unit 130A has a resistance of R1 ohm (Ω), the second portion 130A2 of the heating unit 130A has a resistance of R2Ω, and the third portion 130A3 of the heating unit 130A has a resistance of R3Ω. In the embodiment, the quotient obtained by dividing the resistance R1 of the first portion 130A1 of the heating unit 130A by the sum (R1+R2+R3) of the resistance R1 of the first portion 130A1, the resistance R2 of the second portion 130A2, and the resistance R3 of the third portion 130A3 is less than about 5%, which is expressed by the following formula (1). Alternatively, the ratio of the resistance R1 of the first portion 130A1 of the heating unit 130A may be further reduced, and the quotient obtained by dividing the resistance R1 of the first portion 130A1 of the heating unit 130A by the sum (R1+R2+R3) of the resistance R1 of the first portion 130A1, the resistance R2 of the second portion 130A2, and the resistance R3 of the third portion 130A3 is less than about 1%, which is expressed by the following formula (2). By adjusting the resistance distribution ratio of the heating unit 130A, the heating efficiency of the active area 1113 of the electronic device 100 may be enhanced by the heating unit 130A, and the liquid crystal molecules corresponding to the operation units 140 in the active area 1113 may be at a proper operating temperature.

$$\frac{R1}{(R1+R2+R3)} < 0.05 \qquad \text{formula (1)}$$

$$\frac{R1}{(R1+R2+R3)} < 0.01 \qquad \text{formula (2)}$$

In another embodiment, the quotient obtained by dividing the sum of the resistance R1 of the first portion 130A1 and the resistance R2 of the resistance R1 of the second portion 130A2 (R1+R2) of the heating unit 130A by the sum of the resistance R1 of the first portion 130A1, the resistance R2 of the second portion 130A2, and the resistance R3 of the third portion 130A3 (R1+R2+R3) is less than about 15%, which is expressed by the following formula (3). Alternatively, the ratio of the sum (R1+R2) of the resistances of the first portion 130A1 and the second portion 130A2 of the heating unit 130A may be further reduced, so that the quotient obtained by dividing the sum of the resistance R1 of the first portion 130A1 and the resistance R2 of the second portion 130A2 of the heating unit 130A by the sum (R1+R2+R3) of the resistance R1 of the first portion 130A1, the resistance R2 of the second portion 130A2, and the resistance R3 of the third portion 130A3 is less than about 10%, which is expressed by the following formula (4). Thereby, the heating efficiency of the active area 1113 of the electronic device 100 may be enhanced by the heating unit 130A.

$$\frac{(R1+R2)}{(R1+R2+R3)} < 0.15 \qquad \text{formula (3)}$$

$$\frac{(R1+R2)}{(R1+R2+R3)} < 0.1 \qquad \text{formula (4)}$$

Figure 4:
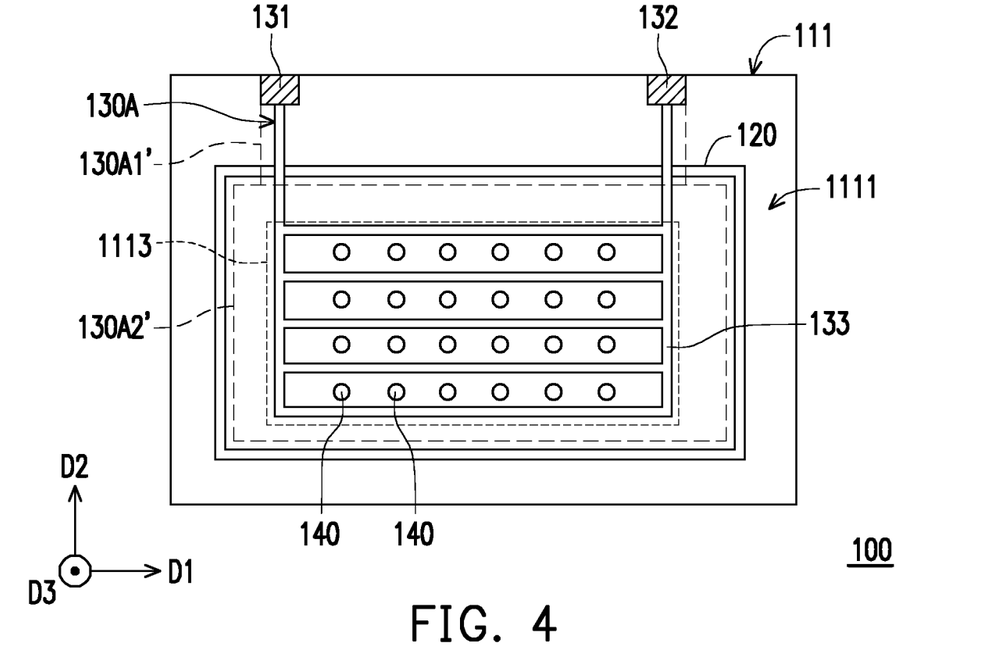
FIG. 4 schematically illustrates a configuration of a second resistance of the heating unit according to an embodiment of the disclosure.

FIG. 4 schematically illustrates a configuration of a second resistance of the heating unit according to an embodiment of the disclosure. With reference to FIG. 1A and FIG. 4, for instance, the heating unit 130A may be disposed on the first substrate 111, which should however not be construed as a limitation in the disclosure. In other embodiments of the disclosure, the heating unit 130A may also be arranged at the location shown in FIG. 1B, FIG. 1C, or FIG. 1D. In addition, since the configuration in FIG. 4 and the configuration in FIG. 2 are the same, the same components share the same reference numbers and will not be further described hereinafter. In the embodiment, the heating unit 130A includes a first portion 130A1' and a second portion 130A2'. The second portion 130A2' is located in a range surrounded by the sealant 120. For instance, the range surrounded by the sealant 120 does not include the area where the sealant 120 is located, i.e., where the liquid crystal layer 113 is located, and the second portion 130A2' overlaps the area surrounded by the sealant 120 in the top view direction of the first substrate 111 (or the normal direction or the direction D3 of the first substrate 111). The first portion 130A1' of the heating unit 130A is a portion other than the second portion 130A2' of the heating unit 130A. The first portion 130A1' of the heating unit 130A includes the first pad 131, the second pad 132, and some of the heating wire s133 connected to the first pad 131 and the second pad 132. The first portion 130A1' of the heating unit 130A has a resistance of R1'Ω, and the second portion 130A2' of the heating unit 130A has a resistance of R2'Ω. The resistance R1' of the first portion 130A1' is less than the resistance R2' of the second portion 130A2'. In the embodiment, the quotient obtained by dividing the resistance R1' of the first portion 130A1' of the heating unit 130A by the sum (R1'+R2') of the resistance R1' of the first portion 130A1' and the resistance R2' of the second portion 130A2' is less than about 10%, which is expressed by the following formula (5). The ratio of the resistance R1' of the first portion 130A1' of the heating unit 130A may be further reduced, so that the quotient obtained by dividing the resistance R1' of the first portion 130A1' of the heating unit 130A by the sum (R1'+R2') of the resistance R1' of the first portion 130A1' and the resistance R2' of the second portion 130A2' is less than about 5%, which is expressed by the following formula (6). Thereby, the heating efficiency of the active area 1113 of the electronic device 100 may be enhanced by the heating unit 130A.

$$\frac{R1'}{(R1'+R2')} < 0.1 \qquad \text{formula (5)}$$

$$\frac{R1'}{(R1'+R2')} < 0.05 \qquad \text{formula (6)}$$

Note that the resistance of parts of the heating unit 130A in FIG. 3 and FIG. 4 may be measured by using a resistance measuring instrument after electrically separating each part of the heating unit 130A. In the electrical separation method, for instance, each part of the heating unit 130A (such as the connection part between the first pad 131 and the heating wires 133) may be disconnected by laser, which should however not be construed as a limitation in the disclosure. The resistance measuring instrument may be a volt-ohm-milliammeter (VOM) which applies a probe to contact each disconnected part of the heating unit 130A to measure the resistance of the disconnected part of the heating unit 130A, and the above-mentioned resistance ratio relationship may be further calculated.

The cross-sectional structure of any area of the heating unit 130A depicted in FIG. 2 to FIG. 4 may be selectively designed to be structure shown in the following FIG. 5 to FIG. 8. That is, the first portion 130A1, the second portion 130A2, and the third portion 130A3 of the heating unit 130A in FIG. 3 and the first portion 130A1' and the second portion 130A2' of the heating unit 130A in FIG. 4 may be formed by the same or different single-layer conductors or multi-layer conductors. In other words, the aforesaid heating unit 130A in FIG. 2 to FIG. 4 includes the first pad 131, the second pad 132, and the heating wires 133, and the first pad 131, the second pad 132, and the heating wires 133 may be designed as a single-layer conductor or a multi-layer conductor with different cross-sectional structures. In addition, the heating wires 133 may also have different cross-sectional structures in different heating regions, which can be determined according to the heating requirements of each heating region.

FIG. 3 is taken as an example. Here, the first portion 130A1 of the heating unit 130A may have the cross-sectional structure design in FIG. 8, for instance, the second portion 130A2 of the heating unit 130A may have the cross-sectional structure design in FIG. 5, for instance, and the third portion 130A3 of the heating unit 130A may have the cross-sectional structure design in FIG. 6, for instance, which should however not be construed as limitations in the disclosure. As such, the heating unit 130A in FIG. 3 can comply with the requirement for the resistance ratios provided in the formulas (1) to (4) through different cross-sectional structure designs of different parts. The same principle is also applicable if FIG. 4 is taken as an example. That is to say, in some embodiments of the disclosure, the ratio relationship between the resistances of the heating unit 130A provided in the embodiments shown in FIG. 3 and FIG. 4 may be realized by designing the heating unit 130A to have different cross-sectional structures in different parts of the heating unit 130A. The heating wires are taken as an example to elaborate the cross-sectional structures with reference to FIG. 5 to FIG. 8, which should however not be construed as a limitation in the disclosure.

Figure 5:
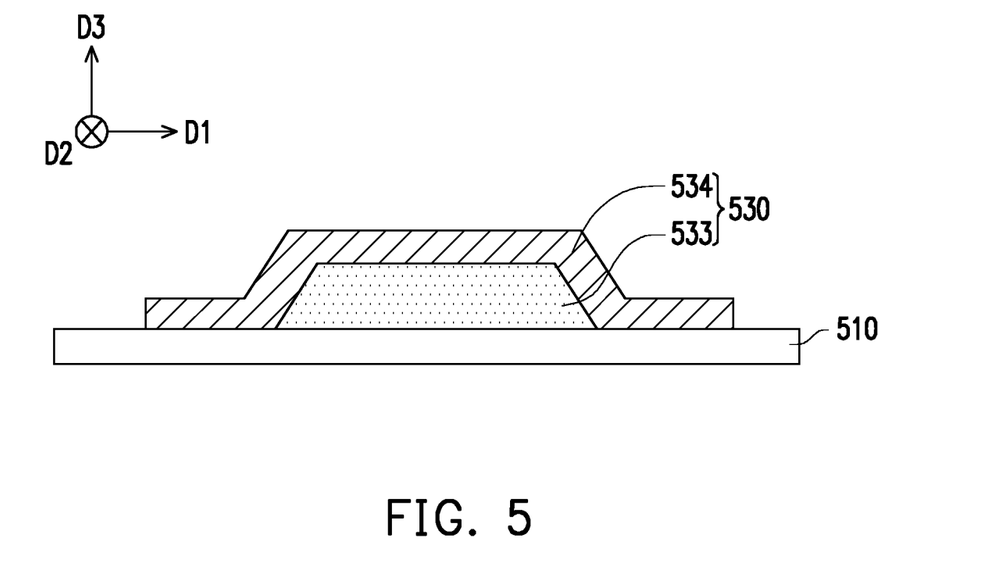
FIG. 5 is a schematic cross-sectional view of a first structure of a heating unit according to an embodiment of the disclosure.

FIG. 5 is a schematic cross-sectional view of a first structure of a heating unit according to an embodiment of the disclosure. With reference to FIG. 5, in the embodiment, a heating wire 530 includes a first conductive layer 533 and a second conductive layer 534. The first conductive layer 533 and the second conductive layer 534 may be made of the same conductive material or different conductive materials. The first conductive layer 533 is formed on the substrate 510 first, and the second conductive layer 534 is formed on the substrate 510 and covers the first conductive layer 533. In the embodiment, the resistance of the heating wire 530 may be adjusted through the structural design of the first conductive layer 533 and the second conductive layer 534, e.g., the material, the length, the width, or the height of the first conductive layer 533 and the second conductive layer 534.

Figure 6:
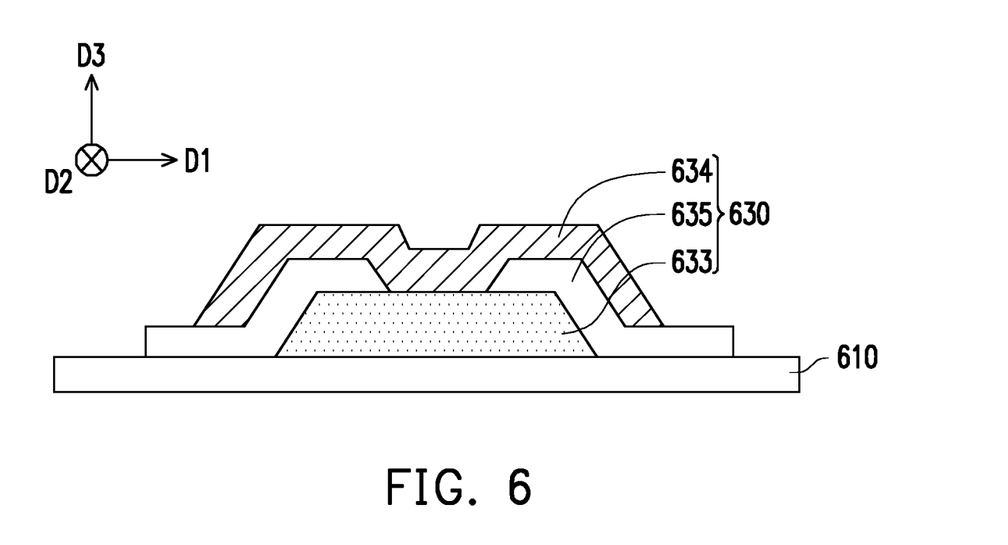
FIG. 6 is a schematic cross-sectional view of a second structure of the heating unit according to an embodiment of the disclosure.

FIG. 6 is a schematic cross-sectional view of a second structure of the heating unit according to an embodiment of the disclosure. With reference to FIG. 6, in the embodiment, a heating wire 630 includes a first conductive layer 633, a second conductive layer 634, and an insulation layer 635. The first conductive layer 633 and the second conductive layer 634 may be made of the same conductive material or different conductive materials. The first conductive layer 633 is formed on the substrate 610 first, and then the insulation layer 635 is formed on the substrate 610 and partially covers the first conductive layer 633. The second conductive layer 634 is formed on the insulation layer 635 and is coupled to the first conductive layer 633. In the embodiment, the resistance of the heating wire 630 may be adjusted through the structural design of the first conductive layer 633, the second conductive layer 634, and the insulation layer 635, e.g., the material, the length, the width, or the height of the first conductive layer 633, the second conductive layer 634, and the insulation layer 635.

Figure 7:
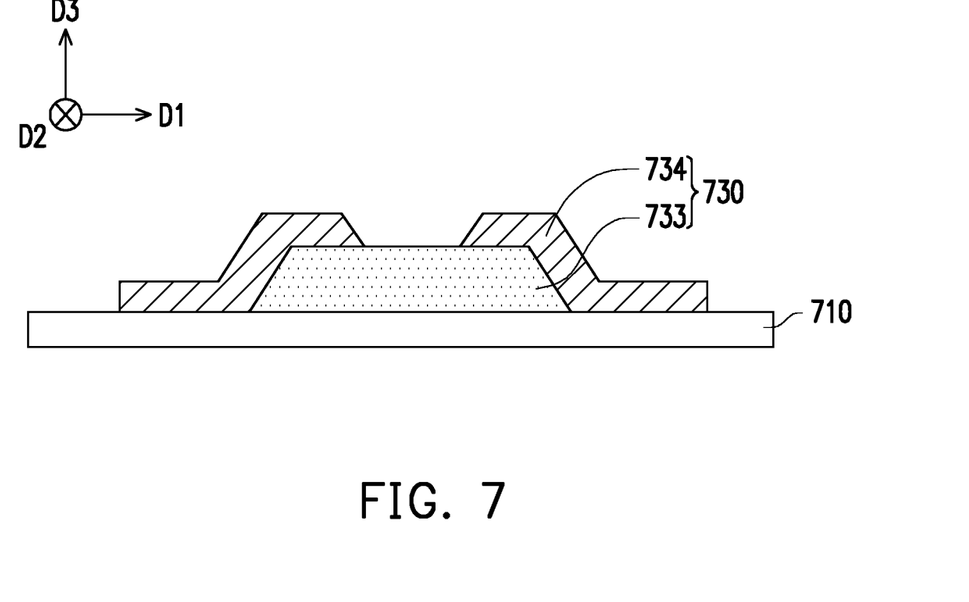
FIG. 7 is a schematic cross-sectional view of a third structure of the heating unit according to an embodiment of the disclosure.

FIG. 7 is a schematic cross-sectional view of a third structure of the heating unit according to an embodiment of the disclosure. With reference to FIG. 7, in the embodiment, a heating wire 730 includes a first conductive layer 733 and a second conductive layer 734. The first conductive layer 733 and the second conductive layer 734 may be made of the same conductive material or different conductive materials. The first conductive layer 733 is formed on the substrate 710 first, and then the second conductive layer 734 is formed on the substrate 710 and partially covers the first conductive layer 733. In the embodiment, the resistance of the heating wire 730 may be adjusted through the structural design of the first conductive layer 733 and the second conductive layer 734, e.g., the material, the length, the width, the height, or the size of the overlapping area of the first conductive layer 733 and the second conductive layer 734.

Figure 8:
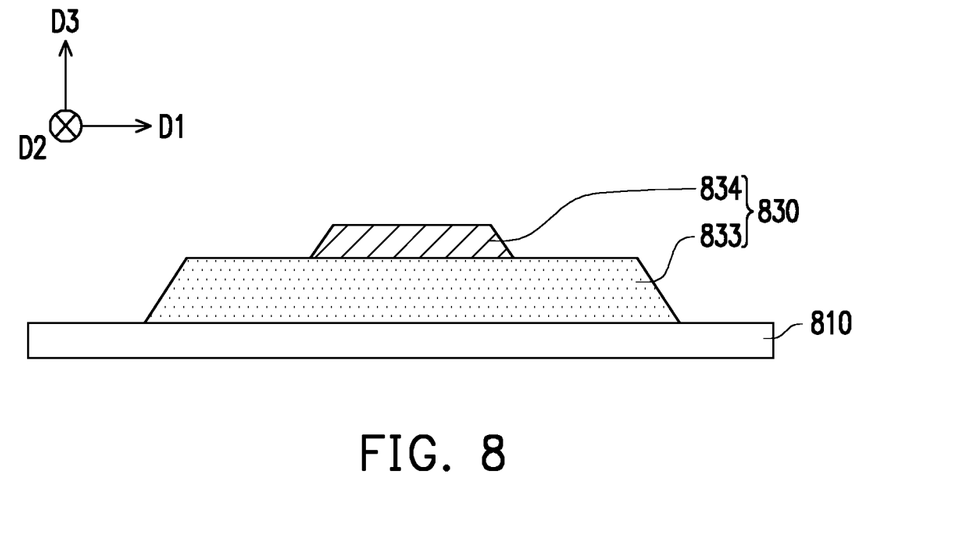
FIG. 8 is a schematic cross-sectional view of a fourth structure of the heating unit according to an embodiment of the disclosure.

FIG. 8 is a schematic cross-sectional view of a fourth structure of the heating unit according to an embodiment of the disclosure. With reference to FIG. 8, in the embodiment, a heating wire 830 includes a first conductive layer 833 and a second conductive layer 834. The first conductive layer 833 and the second conductive layer 834 may be made of the same conductive material or different conductive materials. The first conductive layer 833 is formed on the substrate 810 first, and then the second conductive layer 834 is formed on the first conductive layer 833. As shown in FIG. 8, a projection area of the second conductive layer 834 on the substrate 810 is less than a projection area of the first conductive layer 833 on the substrate 810. In the embodiment, the resistance of the heating wire 830 may be adjusted through the structural design of the first conductive layer 833 and the second conductive layer 834, e.g., the material, the length, the width, the height, or the size of the overlapping area of the first conductive layer 833 and the second conductive layer 834.

To sum up, in the electronic device provided in one or more embodiments of the disclosure, the circuits or components disposed in the active area of the substrate may be heated by the heating unit, so that the electronic device provided in one or more embodiments of the disclosure may still be operated in a low temperature environment.

Although the disclosure has been described with reference to the above embodiments, it will be apparent to one of ordinary skill in the art that modifications to the described embodiments may be made without departing from the spirit of the disclosure. Accordingly, the scope provided in the disclosure is defined by the attached claims not by the above detailed descriptions.

What is claimed is:

1. An electronic device, comprising:
   a pair of substrates, each comprising a peripheral area and an active area, each of the peripheral areas being adjacent to an edge of a corresponding one of the pair of substrates;
   a sealant, disposed between the pair of substrates; and
   a heating unit, disposed on one of the pair of substrates, wherein the heating unit comprises a first portion disposed in the peripheral area of the one of the pair of substrates and adjacent to an edge of the one of the pair of substrates, a third portion disposed in the active area, and a second portion connecting the first portion and the third portion,
   wherein a resistance of the first portion is less than a resistance of the third portion,
   wherein a quotient obtained by dividing the resistance of the first portion of the heating unit by a sum of the resistance of the first portion, a resistance of the second portion, and the resistance of the third portion of the heating unit is less than 5%.

2. The electronic device according to claim 1, wherein the first portion of the heating unit comprises a voltage input pad.

3. The electronic device according to claim 2, wherein the first portion of the heating unit further comprises another voltage input pad, and the heating unit further comprises a plurality of heating wires coupled between the voltage input pad and the another voltage input pad.

4. The electronic device according to claim 3, wherein the voltage input pad and the another voltage input pad are disposed in the peripheral area of the one of the pair of substrates and adjacent to the edge of the one of the pair of substrates.

5. The electronic device according to claim 3, wherein the voltage input pad and the another voltage input pad have a voltage difference.

6. The electronic device according to claim 1, wherein the quotient obtained by dividing the resistance of the first portion of the heating unit by the sum of the resistance of the first portion, the resistance of the second portion, and the resistance of the third portion of the heating unit is less than 1%.

7. The electronic device according to claim 1, wherein a quotient obtained by dividing a sum of the resistance of the first portion of the heating unit and the resistance of the second portion of the heating unit by the sum of the resistance of the first portion, the resistance of the second portion, and the resistance of the third portion of the heating unit is less than 15%.

8. The electronic device according to claim 7, wherein the quotient obtained by dividing the sum of the resistance of the first portion of the heating unit and the resistance of the second portion of the heating unit by the sum of the resistance of the first portion, the resistance of the second portion, and the resistance of the third portion of the heating unit is less than 10%.

9. The electronic device according to claim 1, wherein at least a portion of the heating unit is formed by a single-layer conductor or a multi-layer conductor.

10. The electronic device according to claim 9, wherein the first portion, the second portion and the third portion of the heating unit are respectively formed by different structures of the single-layer conductor or the multi-layer conductor.

11. The electronic device according to claim 1, further comprising:
a liquid crystal layer, disposed between the pair of substrates, wherein the sealant surrounds the liquid crystal layer, and the heating unit is configured to adjust an operating temperature of the liquid crystal layer.

12. An electronic device, comprising:
a pair of substrates;
a sealant, disposed between the pair of substrates; and
a heating unit, disposed on one of the pair of substrates, wherein the heating unit comprises a first portion and a second portion, wherein the second portion is disposed within a range surrounded by the sealant, and the first portion is a portion of the heating unit other than the second portion of the heating unit,
wherein a resistance of the first portion is less than a resistance of the second portion,
wherein a quotient obtained by dividing the resistance of the first portion of the heating unit by a sum of the resistance of the first portion and the resistance of the second portion of the heating unit is less than 10%.

13. The electronic device according to claim 12, wherein the quotient obtained by dividing the resistance of the first portion by the sum of the resistance of the first portion and the resistance of the second portion of the heating unit is less than 5%.

14. The electronic device according to claim 12, wherein the first portion of the heating unit comprises a voltage input pad.

15. The electronic device according to claim 14, wherein the first portion of the heating unit further comprises another voltage input pad, and the heating unit further comprises a plurality of heating wires coupled between the voltage input pad and the another voltage input pad.

16. The electronic device according to claim 15, wherein the voltage input pad and the another voltage input pad are disposed in the peripheral area of the one of the pair of substrates and adjacent to the edge of the one of the pair of substrates, and the voltage input pad and the another voltage input pad have a voltage difference.

17. The electronic device according to claim 12, wherein the heating unit is formed by a single-layer conductor or a multi-layer conductor.

18. The electronic device according to claim 12, further comprising:
a liquid crystal layer, disposed between the pair of substrates, wherein the sealant surrounds the liquid crystal layer, and the heating unit is configured to adjust an operating temperature of the liquid crystal layer.

* * * * *